(12) United States Patent
Nagata

(10) Patent No.: US 6,304,287 B1
(45) Date of Patent: Oct. 16, 2001

(54) IMAGE VIEWING DEVICE AND OPERATION UNIT FOR SAID IMAGE VIEWING DEVICE, ACCESSORIES USED WITH SAID IMAGE VIEWING DEVICE, A FACILITY IN WHICH SAID DEVICE AND ACCESSORIES ARE USED, AND METHOD OF USING SAID IMAGE VIEWING DEVICE

(75) Inventor: Hideki Nagata, Sakai (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 08/978,309

(22) Filed: Nov. 25, 1997

(30) Foreign Application Priority Data

Nov. 27, 1996 (JP) .................................................. 8-316019

(51) Int. Cl.[7] ............................ H04N 9/47; H04N 13/04; G09G 5/00; G01B 27/14

(52) U.S. Cl. ................................. 348/53; 348/53; 348/51; 348/739; 348/838; 345/7; 345/8; 359/630; 359/631; 359/632; 359/477

(58) Field of Search ................................ 348/51, 53, 739, 348/838; 345/8, 7; 359/631, 630, 477, 632, 633

(56) References Cited

U.S. PATENT DOCUMENTS

| | | | | |
|---|---|---|---|---|
| 5,003,300 | * | 3/1991 | Wells | 345/8 |
| 5,281,957 | * | 1/1994 | Schoolman | 345/8 |
| 5,408,346 | * | 4/1995 | Trissel | 359/65 |
| 5,506,705 | * | 4/1996 | Yamamoto et al. | 359/40 |
| 5,621,572 | * | 4/1997 | Fergason | 359/630 |
| 5,642,221 | * | 6/1997 | Fischer et al. | 359/477 |
| 5,673,059 | * | 9/1997 | Zavracky et al. | 345/8 |
| 5,815,126 | * | 9/1998 | Fan et al. | 345/8 |
| 5,853,240 | * | 12/1998 | Tanaka et al. | 353/20 |
| 5,880,773 | * | 3/1999 | Suzuki | 348/115 |
| 5,900,849 | * | 3/1999 | Gallery | 340/705 |
| 5,903,395 | * | 5/1999 | Rallison et al. | 359/630 |
| 5,936,663 | * | 8/1999 | Tabata et al. | 348/51 |
| 6,008,945 | * | 12/1999 | Fergason | 359/630 |

* cited by examiner

Primary Examiner—John Peng
Assistant Examiner—Paulos Natnael
(74) Attorney, Agent, or Firm—Sidley Austin Brown & Wood

(57) ABSTRACT

In order to allow the user to see the surrounding area without obstructing the image so that he may use an operation unit or eat and drink while viewing the image while leaving an image viewing device mounted on the head, at least a part of the frame unit of the image viewing device has the property of allowing light of a specific wavelength to pass through it, and a light source for the light of said specific wavelength is mounted on, for example, containers as well as on the operation unit.

51 Claims, 4 Drawing Sheets

IMAGE VIEWING DEVICE AND OPERATION UNIT FOR SAID IMAGE VIEWING DEVICE, ACCESSORIES USED WITH SAID IMAGE VIEWING DEVICE, A FACILITY IN WHICH SAID DEVICE AND ACCESSORIES ARE USED, AND METHOD OF USING SAID IMAGE VIEWING DEVICE

BACKGROUND OF THE INVENTION

1. Field of the Invention

The present invention pertains to (i) an image viewing device constructed such that the user places it on his head and observes an image by looking inside a frame unit through viewing windows, (ii) an operation unit used with said image viewing device, (iii) accessories used with said image viewing device, and (iv) a facility in which said device and accessories are used.

2. Description of the Prior Art

Conventionally, image viewing devices of the type described above are equipped with a closed frame unit, an image display unit inside said frame unit, viewing windows through which the user can observe the image display unit, and a mounting member (band, etc.) by which it may be mounted onto the user's head. This type of image viewing device is mounted on the user's head so that the viewing windows are aligned with the user's eyes, such that by looking inside the frame unit through the viewing windows, a video image, television broadcast image or game image may be observed. When this image viewing device is used, the user may concentrate on the image and obtain a feeling of realism as if he himself were inside the image.

However, on the other hand, when the user uses the image viewing device, the user can look only inside the frame unit, and so, for example, it is difficult to use an operation unit, such as a remote control unit, to operate this image viewing device. It is also difficult to drink beverages or eat snacks when viewing an image using this device.

Though it is naturally possible to use a remote control unit or eat and drink if the image viewing device is removed, the image can no longer be seen for the period of time that the device is removed, and the feeling of realism is lost. While it is possible for the frame unit to be formed of a light-permeable material so that the area outside the frame unit may be seen, in such a case, because outside light enters the frame unit, the exterior background overlaps onto the image, making it difficult to see, and the feeling of realism regarding the image is destroyed.

As described above, the problem has existed that it is difficult to allow the user to see the area outside the frame unit without destroying the feeling of realism regarding the image.

SUMMARY OF THE INVENTION

An object of the present invention is to allow the user to see the surrounding area while the image viewing device remains mounted on the user's head or face without destroying the feeling of realism, and to thereby enable the user to use an external operation unit or eat and drink while still viewing the image.

An object of the present invention is to allow the user to see the surrounding area while the image viewing device remains mounted on the user's head without destroying the feeling of realism, and to thereby enable the user to use an external operation unit or eat and drink while still viewing the image.

In order to attain said object, one aspect of the present invention has the construction described below. In other words, the image viewing device is equipped with a frame unit, an image display unit located inside said frame unit, viewing members located in the frame unit to enable the viewing of the image display unit, and a mounting member by which to mount the frame unit on the user's head or face, wherein at least a part of the frame unit has the property of allowing light of a specific wavelength to pass through.

By means of said construction, because the user can see surrounding light of the specific wavelength through at least a part of the frame unit even while the user still has the image viewing device mounted to his head or face and is viewing an image, if a light source for light of the specific wavelength is incorporated in the operation unit for said image viewing device, or if a light source for light of the specific wavelength is incorporated in accessories used together with the image viewing device (such as a coffee cup), the position of the operation unit or accessories can be confirmed even while the image is being viewed. The same effect may be obtained by incorporating in accessories used with the image viewing device a reflective surface that reflects light of the specific wavelength, and by projecting light of this wavelength from an illuminating device. Therefore, because it is unnecessary to remove the image viewing device to look for these items, the user need not be bothered to remove the image viewing device from his head or face, and can operate the operation unit as well as eat and drink without losing the feeling of realism regarding the image.

In the present invention, the term 'accessories' includes household items such as containers for food and drink, or equipment that can be used when the user has the image viewing device mounted to his head (for example, an on/off switch for an illumination lamp or a remote control unit for other electronic equipment (such as a videotape recorder, air conditioner, etc.)).

These and other objects, advantages and features of the invention will become apparent from the following description thereof taken in conjunction with the accompanying drawings, which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

Figure 1:
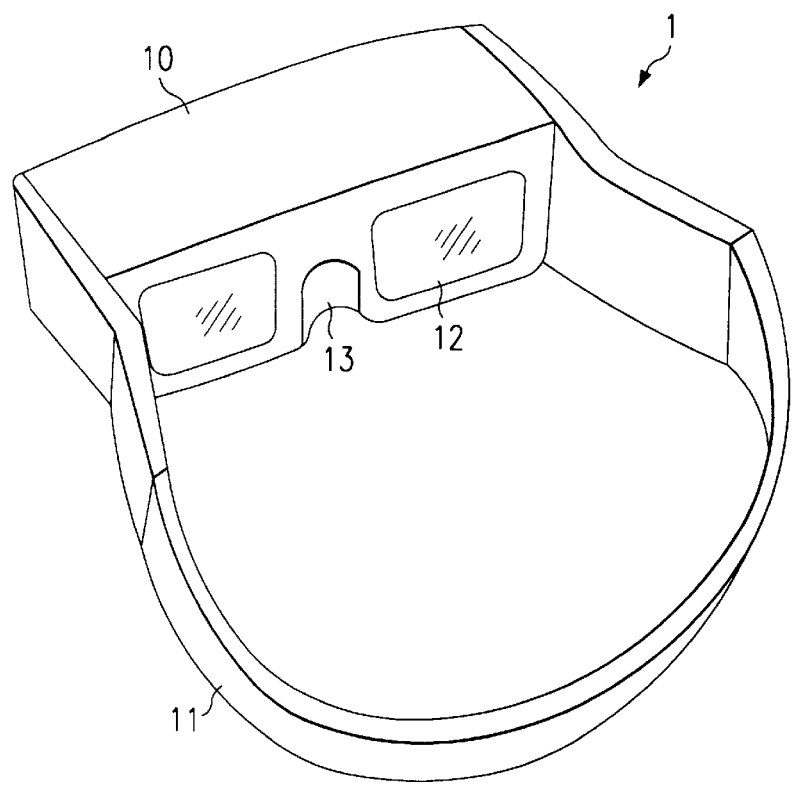
FIG. 1 is a perspective view showing the exterior configuration of the image viewing device of one embodiment of the present invention.

FIG. 1 is a perspective view showing the exterior configuration of image viewing device 1 of one embodiment of the present invention. This image viewing device 1 is used by mounting it on the user's head, and is equipped with frame unit 10 and a band 11 that serves as a mounting member for mounting the frame unit 10 onto the user's head. Viewing windows 12 that come in close proximity to the user's eyes and a concave area 13 to rest on the user's nose are located on the inside surface (head mounting surface) of the frame unit 10.

Figure 2:
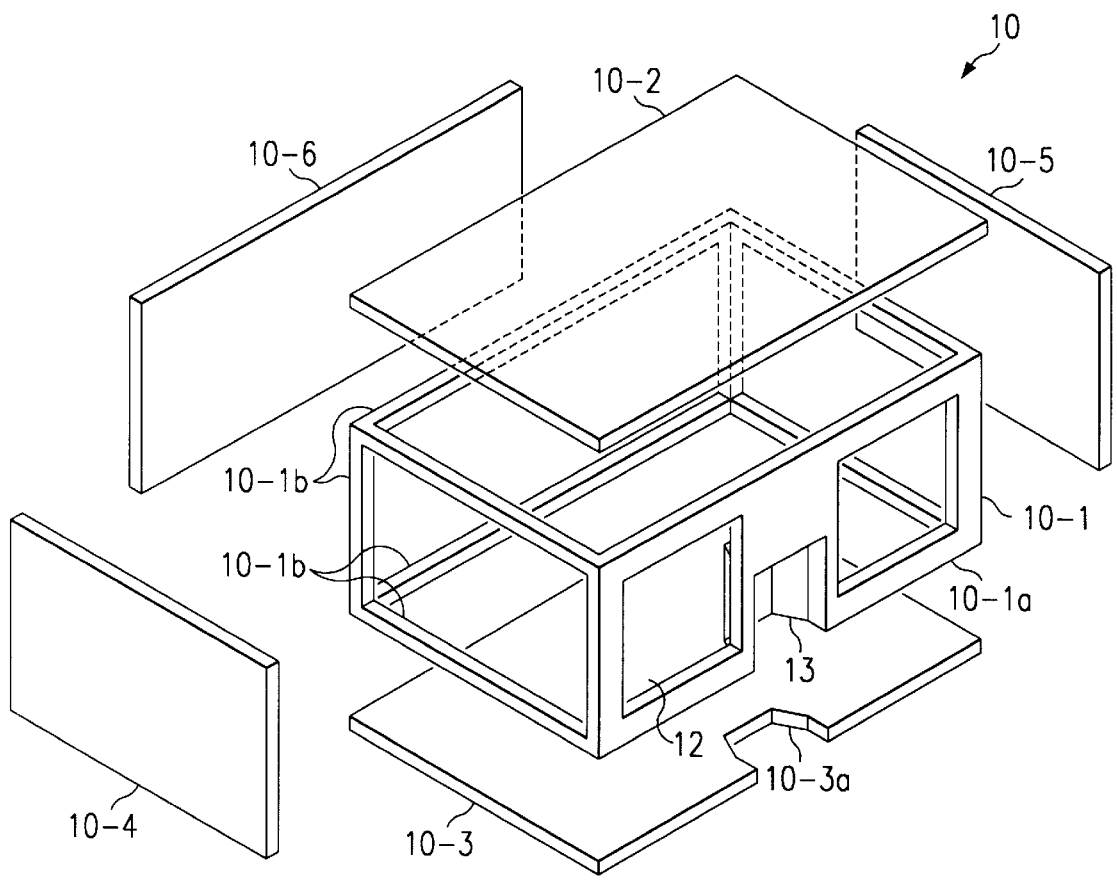
FIG. 2 is an exploded perspective view of the frame unit of the image viewing device of FIG. 1.

FIG. 2 is an exploded perspective view of the frame unit 10. This frame unit 10 comprises a frame 10-1, a top plate 10-2, a bottom plate 10-3, a pair of side plates 10-4 and 10-5, and a back plate 10-6, which are all attached to the frame 10-1. The frame 10-1 is integrally formed from a viewing surface 10-1a and support members 10-1b for each of the plates 10-2 through 10-6. The viewing windows 12 are formed in two areas in the viewing surface 10-1a, and the concave area 13 is formed in the bottom part of the area between the viewing windows 12, approximately halfway down. The concave area 10-3a is also formed in the bottom plate 10-3 such that it will match the concave area 13. Thin glass plates coated with a band pass filter to provide the glass plates with light-permeability for light of a certain wavelength (narrow-band) and then covered by protective clear plastic are used for the top plate 10-2, bottom plate 10-3, side plates 10-4 and 10-5, and back plate 10-6.

Figure 3:
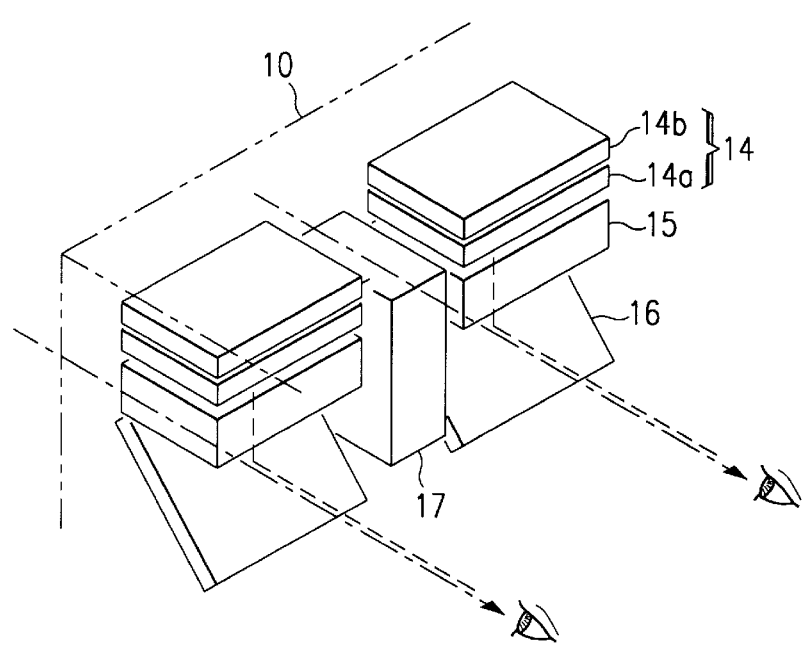
FIG. 3 is a perspective view showing the internal construction of the image viewing device of FIG. 1.

FIG. 3 is a perspective view showing the internal construction of the image viewing device 1. In the drawing, 14 is a pair of display elements each comprising a liquid crystal display device (image display unit) 14a and a back light 14b, 15 is a pair of eyepieces, 16 is a pair of half-mirrors, and 17 is a signal processing circuit. The user can observe the image on the display element 14 through the half-mirrors 16 and the eyepieces 15, as shown by the dashed arrow lines, and can simultaneously see light of a specific wavelength that passes through the frame unit 10 indicated by the two-dot chain line in the drawing, through the half-mirrors 16 as indicated by the chain arrow lines. Because the light source that emits light of the specific wavelength would appear enlarged if the eyepieces 15 were mounted in the viewing windows 12, the eyepieces 15 are located below the display elements 14 in order to avoid such a problem. Transparent plastic plates are fixed to the viewing windows 12 of the frame unit 10, such that the light source emitting light of the specific wavelength that is located in front of the half-mirrors 16 can be seen through the half-mirrors.

Figure 4:
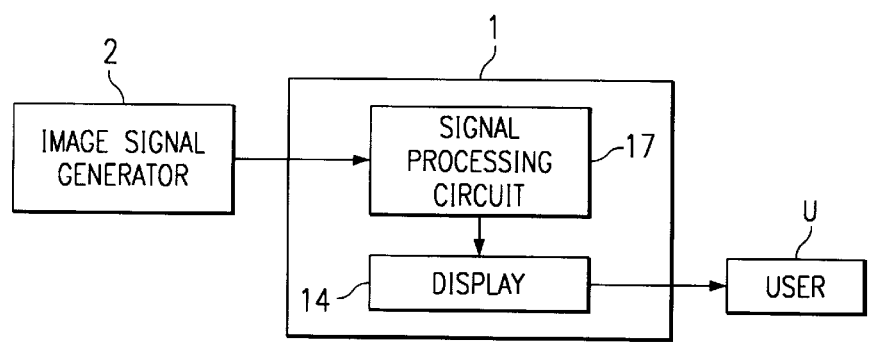
FIG. 4 is a block diagram showing the control system for the image viewing device of FIG. 1.

FIG. 4 is a block diagram showing the control system for the image viewing device 1. As shown in the drawing, the image viewing device 1 is used by connecting it to an image signal generator 2 comprising an image recording device such as a video camera, videotape recorder or computer graphics-based device (such as a game), wherein signals from this image signal generator 2 are input to the signal processing circuit 17. The signal processing circuit 17 is connected to the display elements 14 comprising liquid crystal displays (LCDs), etc., and displays an image by driving the display elements 14 so that user U can observe the image. In the drawing, the image signal generator 2 is shown as a device separate from the image viewing device 1, but where the image signal generating device 2 is a television broadcast tuner, for example, the image signal generating device 2 may be incorporated in the image viewing device 1.

Figure 5A:
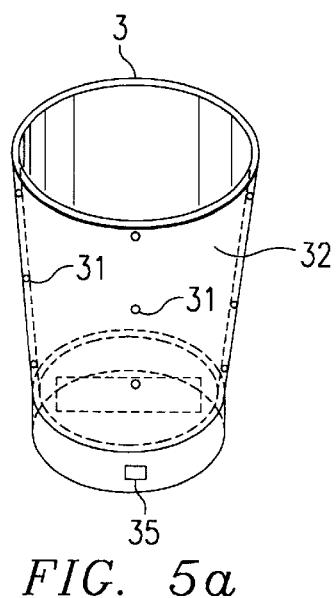
FIGS. 5(a) and 5(b) are perspective views showing a cup used in a place where the image viewing device of FIG. 1 is used.
Figure 5B:
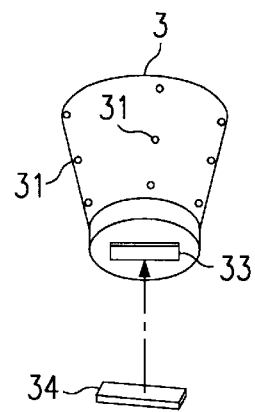

Next, the accessories and the external operation unit, which are embodiments of the present invention, used in a place where the image viewing device is used will be explained with reference to FIGS. 5 through 8. First, a cup used for drinking shown in FIGS. 5(a) and 5(b) will be explained. FIG. 5(a) is a perspective view showing the exterior configuration of a cup 3. The cup 3 is made of a transparent plastic, and multiple LEDs (light-emitting diodes) 31 emitting light of the specific wavelength that permeates the frame unit 10 of the image viewing device 1 are imbedded in outer circumference 32. As shown in FIG. 5(b), which is an exploded perspective view seen from below, a battery compartment 33 for insertion of a battery (not shown in the drawing) to power light emission from the LEDs 31 is located in the bottom of the cup 3, and is covered by a cover 34. In addition, an operating switch 35 to allow the LEDs 31 to alternate between an emitting and non-emitting state is mounted to the lower edge of the cup 3.

Figure 6:
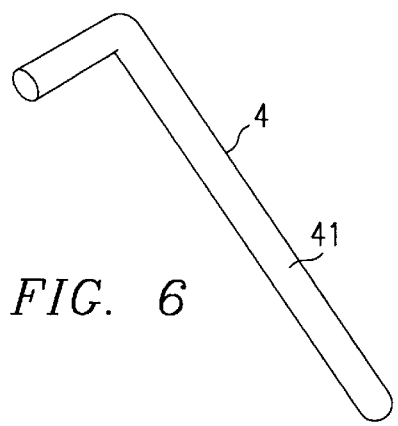
FIG. 6 is a perspective view showing a straw used in a place where the image viewing device of FIG. 1 is used.

FIG. 6 is a perspective view showing a drinking straw 4 used together with the cup 3 in a place where the image viewing device 1 is used. The entire outer circumference 41 of the straw 4 is treated to be phosphorescent (referred as 'phosphorescence treatment' hereinbelow) so that the straw 4 will continuously emit light of the specific wavelength that passes through the frame unit 10 of the image viewing device 1 for a prescribed period of time (for example, approximately 10 hours or longer) after being irradiated with light. Phosphorescence is a type of luminescence, and is a property in which the emission of light (light of a longer wavelength than the incident light) that accompanies the shift from an excited state that occurs when the incident light is received, to a low-energy state, continues for a prescribed period of time. Alternatively, the straw 4 is colored such that it reflects light of the specific wavelength. Or, it is colored such that light including the light of the specific wavelength is reflected. In this case, it is better if the coloring has a shine such that light of the specific wavelength or light including the specific wavelength is reflected more strongly.

Figure 7:
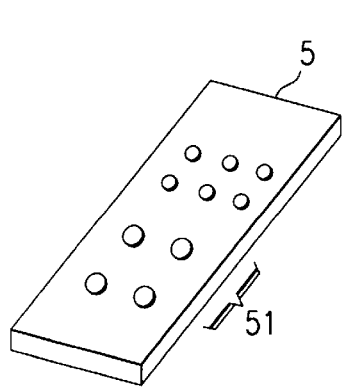
FIG. 7 shows an operation switch to turn on and off an indoor illumination lamp used in a room where the image viewing device of FIG. 1 is used.

FIG. 7 is a perspective view showing a remote control unit 5, which is one embodiment of the present invention, to operate the image viewing device 1. This remote control unit 5 is connected to the image viewing device 1 by means of a cord (not shown in the drawing) so that the image viewing device 1 can be operated conveniently simply by holding the remote control unit 5 in one's hand. The 'phosphorescence treatment' described above is applied to main operation buttons 51 so that they will emit light of the same specific wavelength described above. The 'phosphorescence treatment' applied to the remote control unit 5 should be performed only to operation buttons that are used frequently, because in this way the number of luminescent locations on the remote control unit may be limited and operation may be prevented from becoming difficult. If the operation member of the remote control unit 5 comprises a joystick, for example, and different operations may be performed in accordance with the direction of operation, the number of luminescent locations may be reduced further, thereby allowing the occurrence of mistaken operation to be even more reliably prevented.

The remote control unit 5 may have an operation button 51 containing therein an LED for emitting light of the certain wavelength. The LED emits light when needed so that the operation button 51 can be seen by the user U only when the operation button 51 is necessary to be operated.

Figure 8:
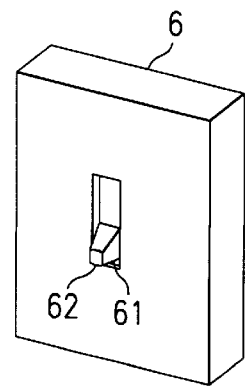
FIG. 8 is a perspective view showing a remote control unit to operate the image viewing device of FIG. 1.

FIG. 8 is a perspective view showing a wall-mounted operation switch 6, which is an embodiment of the present invention, to allow the light in the room (particularly the enhancing light explained below with reference to FIG. 9) to be switched on and off. On the tip of an operation member 61 of the switch 6 is an LED 62 that emits light of the same wavelength as the LEDS used for the cup 3 of FIG. 5.

Figure 9:
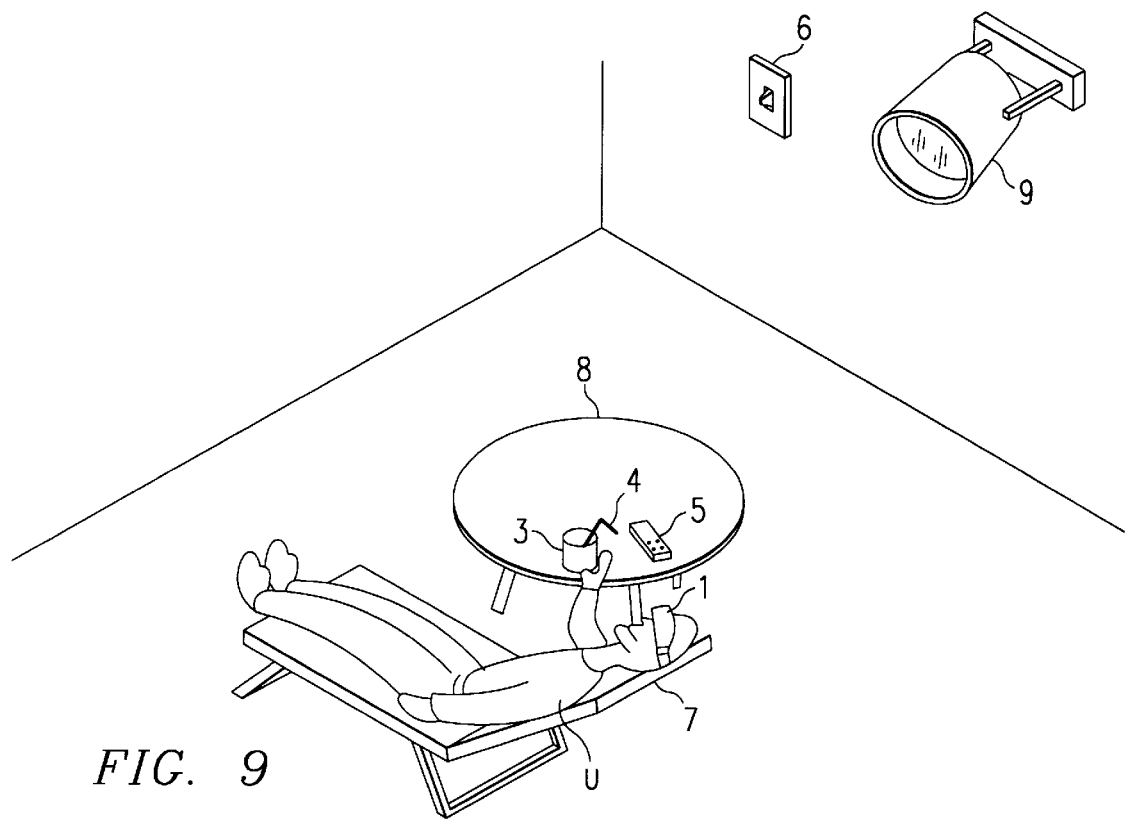
FIG. 9 is a drawing showing the situation where the image viewing device of FIG. 1, the accessories of FIGS. 5 through 7 and the remote control unit of FIG. 8 are being used.

FIG. 9 is a drawing showing the situation in which the image viewing device 1 is being used. User U is using the image viewing device 1 while sitting on a chair 7, while on a table 8 are located the cup 3 of FIG. 5 that contains a beverage and the straw 4 of FIG. 6. Because the image viewing device 1 is mounted to the head of the user U, the user U can see light of the specific wavelength through the frame unit 10 in addition to the image. Therefore, because he may confirm the positions of the cup 3 and the straw 4 placed on the table 8 even while the image viewing device 1 remains on his head, the user U may drink the beverage without removing the image viewing device 1 whenever he wants to do so. In addition, the remote control unit 5 of FIG. 7 or the remote control unit for the image signal processing device 2 such as a videotape recorder (not shown in the drawing) may be operated while the image viewing device 1 is still mounted on the user's head, and the switch of FIG. 8 may also be operated without removing the image viewing device 1.

It is desirable if the switch of FIG. 8 is the operation switch for the illuminating apparatus 9 used to enhance the light of the specific wavelength. For this enhanced illumination, the above-mentioned fact that incident light has a shorter wavelength (higher energy) than emitted light is employed, i.e., illumination with light having a slightly shorter wavelength than the light emitted from the object of attention is used. For example, in the construction described above, if the straw 4 emits blue fluorescent light or phosphorescent light, an illumination apparatus that emits near-ultraviolet light (black light) should be used. In such a case, because the blue light emitted from the straw 4 is enhanced to appear bluer, the user U can observe the straw 4 more clearly while the image viewing device 1 remains mounted on his head. Where the straw 4 reflects blue light, an illumination apparatus that emits blue light should be used.

On the other hand, because light that falls outside the specific wavelength does not pass through the frame unit 10, if the user U's face is facing away from the cup 3 and the straw 4 or the remote control unit 5, the user U can see nothing in the surrounding area. Therefore, the user can concentrate on only the image.

Figure 10:
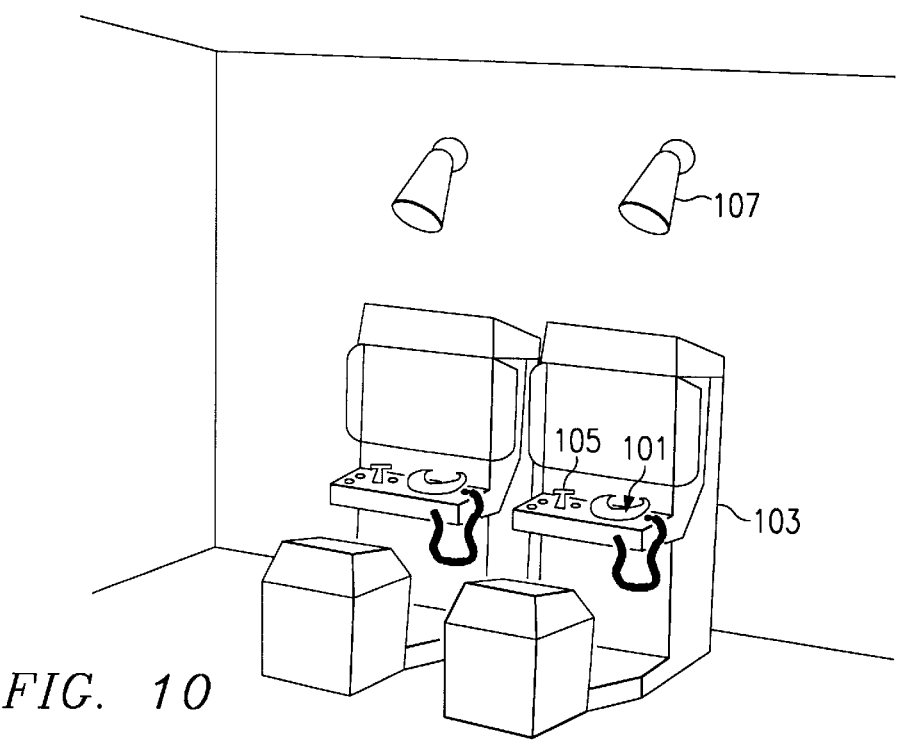
FIG. 10 is a drawing showing the outline of the facility in which to use a system that includes the image viewing device.

FIG. 10 shows a facility in which a system including the image viewing device is used, and shows an outline of the interior of an amusement arcade. In this facility, an image viewing device 101 identical to the one shown in FIG. 1 is connected to a game equipment subject 103 to prescribed computer control and is used as a monitor. The customer is able to view the game screen with a heightened sense of realism as if he were in the middle of the action by means of the image viewing device 101 mounted on his head or face.

The customer plays the game by using a game controller 105 having a configuration and construction appropriate to each game. 'Phosphorescent (luminescent) treatment' is applied to this game controller 105 in the same way as to the remote control unit in FIG. 7, such that the main operation buttons reflect light including light of a specific wavelength that passes through a frame unit of the image viewing device 101. Furthermore, installed on the ceiling and the wall of this facility are both a normal lighting fixture and an illuminating apparatus 107, identical to the illuminating apparatus 9 of FIG. 9, used in order to enhance the light of the specific wavelength. Therefore, the customer can confirm the locations of the operation buttons of the game controller 105 while leaving the image viewing device 101 mounted on his head or face.

In addition, where soft drinks, for example, are provided at the amusement arcade, the customer can drink such a drink without stopping the game if the cup shown in FIG. 5 is provided.

Other than the application described above, in a store selling videos, the image viewing device may be used to view them in the store, and the device to fast-forward or slow-motion the video may also be constructed such that it may be seen through said image viewing device. Where a video viewing service is provided at a coffee shop, the user may eat and drink freely even during said viewing.

While the light source can easily attract the user's attention if made yellow, for example, and this has the advantage that its position may be easily confirmed, conversely, it has the disadvantage of being distracting to the viewing of the image because the human eye has high sensitivity to the color yellow. Therefore, it is desirable to make the color of the light source blue or red, thereby making it less of a distraction to the viewing, and to construct frame unit 10 of the image viewing device 1 such that only light of a wavelength corresponding to either of these colors can pass through it.

The present invention is not limited to the construction described above, and may be realized in various other configurations as well. For example, a different method of light emission for the light source may be chosen, and is not limited to an LED or luminescence processing. For example, where the image viewing device is to be used in a bright environment, 'fluorescence treatment (that is, the outer surface of the device is treated to be fluorescent)' may be performed instead of 'luminescence treatment'.

In the construction described above, components 10-2 through 10-6 of frame unit 10 comprise glass plates having a band pass filter coating, but colored transparent plates, for example, red transparent plates, may be used as a simplified variation. In such case, because at least one color can be excluded even where colored transparent plates are used, a certain degree of effectiveness can be obtained.

In the construction described above, frame unit 10 was explained as having the property of light-permeability to light of a specific wavelength over almost its entire surface, but it is possible for only the back plate 10-6, only the areas of the back plate 10-6 corresponding to the viewing windows 12, or for a different area to have said property.

While the above described embodiment comprises the image viewing device 1 used by mounting it to the user's head or hand, wherein the frame unit 10 has the property of light-permeability to light of a specific wavelength, it is effective to construct the frame unit of a material having light-permeability to light of a specific wavelength in a hand-held type image viewing device as well, because the position of the object of attention can be determined while the image is being viewed.

'Phosphorescence' is accomplished by applying phosphorescent material by coating, printing or the like.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image viewing system comprising:
   a frame unit; and
   an image display system located inside said frame unit for displaying an image;
   wherein at least a part of said frame unit has a property of allowing light of a specific wavelength to pass through; and
   wherein said frame unit can completely encompass a user's field of view for both eyes so that the user can see the displayed image and can see objects outside of said frame unit only when the objects emit or reflect radiation of the specific wavelength.

2. An image viewing system as stated in claim 1, wherein said image display system includes a display device for displaying the image thereon and a viewing member located in said frame unit to enable the viewing of the image displayed on said display device.

3. An image viewing system comprising:
   a frame unit;
   an image display system located inside said frame unit for displaying an image; and
   a controller for controlling the image display of the display system;
   wherein at least a part of said frame unit has a property of allowing light of a specific wavelength to pass through; and
   wherein at least a portion of said controller emits light of the specific wavelength.

4. An image viewing system as stated in claim 3, wherein said controller has a light emitting diode which emits light of the specific wavelength.

5. An image viewing system as stated in claim 3, wherein the portion of said controller is treated to have a luminescent property.

6. An image viewing system as stated in claim 3, wherein the portion of said controller is treated to have a phosphorescent property.

7. An image viewing system as stated in claim 3, wherein the portion of said controller is treated to have a fluorescent property.

8. An image viewing system comprising:
   an image viewing device having a frame unit and a display device located inside said frame unit for displaying an image thereon, wherein at least a part of said frame unit has a property of allowing light of a specific wavelength to pass through; and
   an accessory, wherein at least a portion of said accessory emits light of the specific wavelength.

9. An image viewing system as stated in claim 8, wherein said accessory has a light emitting diode which emits light of the specific wavelength.

10. An image viewing system as stated in claim 8, wherein the portion of said accessory is treated to have a luminescent property.

11. An image viewing system as stated in claim 8, wherein the portion of said accessory is treated to have a phosphorescent property.

12. An image viewing system as stated in claim 8, wherein the portion of said accessory is treated to have a fluorescent property.

13. An image viewing system as stated in claim 10, further comprising an illuminating apparatus which emits light for activating said luminescent property so that said accessory emits light of the specific wavelength.

14. A facility comprising:
    an image viewing device for use in said facility, said image viewing device having a frame unit and a display device located inside said frame unit for displaying an image thereon;
    wherein at least a part of said frame unit has a property of allowing light of a specific wavelength to pass through; and
    an accessory for use in said facility, wherein at least a portion of said accessory emits light of the specific wavelength.

15. A facility as stated in claim 14, further comprising an illuminating apparatus which emits light for enhancing the light emission by said accessory.

16. A facility as stated in claim 15, wherein the portion of said accessory is treated to have a luminescent property and wherein said illuminating apparatus emits light for activating said luminescent property so that said accessory emits light of the specific wavelength.

17. A method of using an image viewing system having an image viewing device having a frame unit and a display device located inside the frame unit for displaying an image thereon, wherein said frame unit can completely encompass a user's field of view for both eyes so that the user can see the displayed image and can see objects outside of said frame unit only when the objects emit or reflect radiation of a specific wavelength, wherein at least a part of the frame unit has a property of allowing light of the specific wavelength to pass through, and using a controller, wherein at least a portion thereof emits light of the specific wavelength, said method comprising:
    mounting on a head or a face said image viewing device for observing an image displayed on the display device; and
    controlling the image display on the display device by operating said controller by observing the portion thereof through said part of said frame unit.

18. A method of using an image viewing system having an image viewing device having a frame unit and a display device located inside the frame unit for displaying an image thereon, wherein at least a part of the frame unit has a property of allowing light of a specific wavelength to pass through, and using a controller, wherein at least a portion thereof emits light of the specific wavelength, said method comprising:
    mounting on a head or a face said image viewing device for observing an image displayed on the display device;
    controlling the image display on the display device by operating said controller by observing the portion thereof through said frame unit; and
    wherein said image viewing system includes a game equipment, wherein said image displayed on the display device is controlled in compliance with the game equipment.

19. An image viewing system as stated in claim 8, wherein said accessory is exterior of said frame unit.

20. A facility as stated in claim 14 wherein said accessory is exterior of said frame unit.

21. An image viewing device comprising:
    a frame unit; and
    an image display system located inside said frame unit for displaying an image;

wherein at least a part of said frame unit has a property of allowing light of a specific wavelength to pass through; and wherein said frame unit can completely encompass a user's field of view for both eyes so that the user can see the displayed image and can see objects outside of said frame unit only when the objects emit or reflect radiation of the specific wavelength.

22. An image viewing device as stated in claim 21, wherein said image display system includes a display device for displaying the image thereon and a viewing member located in said frame unit to enable the viewing of the image displayed on said display device.

23. An image viewing system as stated in claim 3, wherein said part of said frame unit comprises a band pass filter.

24. An image viewing system as stated in claim 8, wherein said part of said frame unit comprises a band pass filter.

25. A facility as stated in claim 14, wherein said part of said frame unit comprises a band pass filter.

26. A method of using an image viewing system as stated in claim 17, wherein said part of said frame unit comprises a band pass filter.

27. A method of using an image viewing system as stated in claim 18, wherein said part of said frame unit comprises a band pass filter.

28. An image viewing device as stated in claim 21, wherein said part of said frame unit comprises a band pass filter.

29. An image viewing system comprising:
a frame unit; and
an image display system attached to said frame unit for displaying an image;
wherein at least a part of said frame unit has a narrow-band transmissibility property that allows light of a limited range of wavelengths to pass through; and
wherein said frame unit is adapted to encompass at least a portion of a user's field of view so that the user can see the displayed image and can see objects outside of said frame unit only when the objects emit or reflect radiation within the limited range of wavelengths.

30. An image viewing system as stated in claim 29, wherein said image display system includes a display device for displaying the image thereon and a viewing member located in said frame unit to enable the viewing of the image displayed on said display device.

31. An image viewing system as stated in claim 29, further comprising a controller for controlling the image display system, wherein at least a portion of said controller emits light within the limited range of wavelengths.

32. An image viewing system as stated in claim 31, wherein said controller has a light emitting diode which emits light within the limited range of wavelengths.

33. An image viewing system as stated in claim 31, wherein the portion of said controller is treated to have a luminescent property.

34. An image viewing system as stated in claim 31, wherein the portion of said controller is treated to have a phosphorescent property.

35. An image viewing system as stated in claim 31, wherein the portion of said controller is treated to have a fluorescent property.

36. An image viewing system comprising:
a frame unit; and
an image display system attached to said frame unit for displaying an image;
wherein at least a part of said frame unit has a narrow-band transmissibility property that allows light of a limited range of wavelengths to pass through; and wherein said frame unit is adapted to interrupt at least a portion of a user's normal field of view so that the user can see the displayed image and can see objects outside of said frame unit only when the objects emit or reflect radiation within the limited range of wavelengths.

37. An image viewing system as stated in claim 36, wherein said image display system includes a display device for displaying the image thereon and a viewing member located in said frame unit to enable the viewing of the image displayed on said display device.

38. An image viewing system comprising:
a frame unit;
an image display system attached to said frame unit for displaying an image; and
a controller for controlling the image display of the display system;
wherein at least a part of said frame unit has a narrow-band transmissibility property that allows light of a limited range of wavelengths to pass through; and
wherein at least a portion of said controller emits light within the limited range of wavelengths.

39. An image viewing system as stated in claim 38, wherein said controller has a light emitting diode which emits light of the specific wavelength.

40. An image viewing system as stated in claim 38, wherein the portion of said controller is treated to have a luminescent property.

41. An image viewing system as stated in claim 38, wherein the portion of said controller is treated to have a phosphorescent property.

42. An image viewing system as stated in claim 38, wherein the portion of said controller is treated to have a fluorescent property.

43. A facility comprising:
an image viewing device for use in said facility, said image viewing device having a frame unit and a display device attached to said frame unit for displaying an image thereon;
wherein at least a part of said frame unit has a narrow-band transmissibility property that allows light of a limited range of wavelengths to pass through; and
an accessory for use in said facility, wherein at least a portion of said accessory emits light within the limited range of wavelengths.

44. A facility as stated in claim 43, wherein said accessory has a light emitting diode which emits light of the specific wavelength.

45. A facility as stated in claim 43, wherein the portion of said accessory is treated to have a luminescent property.

46. A facility as stated in claim 45, further comprising an illuminating apparatus adapted to emit light for activating said luminescent property so that said accessory emits light within the limited range of wavelengths.

47. A facility as stated in claim 43, wherein the portion of said accessory is treated to have a phosphorescent property.

48. A facility as stated in claim 43, wherein the portion of said accessory is treated to have a fluorescent property.

49. A method of using an image viewing system having an image viewing device having a frame unit and a display device attached to the frame unit for displaying an image thereon, wherein said frame unit is adapted to interrupt at least a portion of a user's normal field of view so that the user can see the displayed image and can see objects outside of said frame unit only when the objects emit or reflect radiation of a wavelength within a limited range of wavelengths, wherein at least a part of said frame unit has a narrow-band transmissibility property that only allows light within the limited range of wavelengths to pass through, and using a controller, wherein at least a portion thereof emits light of the specific wavelength, said method comprising:

mounting on a head or a face said image viewing device for observing an image displayed on the display device; and controlling the image display on the display device by operating said controller by observing the portion thereof through said part of said frame unit.

50. A method of using an image viewing system as stated in claim 49, wherein said part of said frame unit comprises a band pass filter.

51. An image viewing system comprising:

a frame unit; and an image display system attached to said frame unit for displaying an image;

wherein at least a part of said frame unit has a narrow-band transmissibility property that allows light of a limited range of wavelengths to pass through; and wherein said frame unit is adapted to interfere with at least a portion of a user's normal field of view so that the user can only clearly appreciate objects outside of said frame that emit or reflect radiation within the limited range of wavelengths.

* * * * *